United States Patent [19]

Whitford

[11] Patent Number: 4,554,056
[45] Date of Patent: Nov. 19, 1985

[54] IMPREGNATION OF NICKEL ELECTRODES USING ELECTRIC PH CONTROL CIRCUITS

[75] Inventor: James C. Whitford, Webb City, Mo.

[73] Assignee: Eagle-Picher Industries, Inc., Cincinnati, Ohio

[21] Appl. No.: 724,403

[22] Filed: Apr. 18, 1985

[51] Int. Cl.⁴ .......................... C25B 1/16; C25D 9/08
[52] U.S. Cl. .................................................. 204/2.1
[58] Field of Search ............................. 204/2.1, 56 R

[56] References Cited

U.S. PATENT DOCUMENTS

| | | | |
|---|---|---|---|
| 3,214,355 | 10/1965 | Kandler | 204/56 R |
| 3,471,338 | 10/1969 | Trachtenberg | 204/2.1 |
| 3,653,967 | 4/1972 | Beauchamp | 204/37.1 |
| 3,827,911 | 8/1974 | Pickett | 204/2.1 |
| 4,180,441 | 12/1979 | Stiker | 204/2.1 |

Primary Examiner—T. M. Tufariello
Attorney, Agent, or Firm—Wood, Herron & Evans

[57] ABSTRACT

A method of preparing a nickel electrode is provided wherein a porous plaque is electrolytically impregnated with nickel hydroxide from a bath by the use of two differently acting electric electrolytic impregnating circuits in the bath. Bath pH can be controlled electrically within the desirable impregnation range.

19 Claims, 3 Drawing Figures

IMPREGNATION OF NICKEL ELECTRODES USING ELECTRIC PH CONTROL CIRCUITS

FIELD OF THE INVENTION

This invention relates to the electrolytic preparation of nickel electrodes for batteries. More particularly, it relates to a method of impregnating nickel hydroxide into a porous plaque from a bath by use of an electrical control system, whereby bath pH can be maintained within a desired range without adjusting the pH by periodic additions of acid or nitrite as has heretofore been required.

BACKGROUND OF THE INVENTION

In the preparation of a nickel electrode by impregnating nickel hydroxide from a bath into a porous plaque, the pH (or relative acidity) of the bath is a critical operating parameter. (As used herein, the term nickel hydroxide is intended to include nickelous hydroxide and nickel oxy-hydroxide.) Bath pH should be acid, in the approximate range of 1.8 to 3.5. Above this range, the bath is insufficiently acid, the hydroxide tends to deposit on or near the surface of the plaque, and hydroxide may start to precipitate in the bath itself. Below this range, the plaque can be corroded by the extreme acidity, and the acid attacks the nickel hydroxide itself. It is therefore necessary to provide some means to maintain pH in this range as impregnation proceeds. This invention is directed to a new, more efficient, and less expensive means of controlling bath pH within the desired range.

In electrolytic impregnation a plaque, which is usually of porous metal such as sintered nickel, is immersed in a bath containing a source of a nickel salt such as nickel nitrate (Ni(No$_3$)$_2$) or the like, and is connected as a cathode in a circuit which includes a source of direct current and an anode. The anode may be of consumable nickel, for example, metallic nickel sheet or rod, scrap nickel, or a consumable nickel oxide. Often the nickel source is contained in an electrically conductive basket of an inert (nonconsumed) material. As direct current is passed from the anode through the bath to the cathode, the nickel salt in the bath is converted through a series of reactions into nickel hydroxide which is deposited within the porous plaque. The general technique of electrolytic deposition is further described in Kandler U.S. Pat. No. 3,214,355, issued Oct. 26, 1965, to which reference may be made for more complete background discussion.

As the deposition of nickel hydroxide proceeds, the pH of the bath, particularly in the region around the cathode, tends to increase. If steps are not taken to maintain pH below about 3.5, and preferably below about 3.0, it eventually becomes undesirably high, with consequences as noted above. Ultimately the deposition will essentially stop, and an inferior electrode will result.

THE PRIOR ART

Various approaches have been taught in the prior art for preventing or off-setting such a rise in pH of an impregnation bath. Kandler U.S. Pat. No. 3,214,355, previously referred to, teaches the maintenance of a pH of about 3 by the addition of acid, for example nitric acid, to the bath as electrolysis continues. The low pH of the added acid reduces that of the bath. Kandler teaches the use of passive nickel as the anode to develop oxygen during the electrolysis, which causes the release of hydrogen ions in the electrolyte. This is said to cause a circulating motion. Beauchamp U.S. Pat. No. 3,653,967 teaches the use of platinum electrodes and the addition of nitrite ions to the bath to stabilize pH. Pickett U.S. Pat. No. 3,827,911 teaches use of an alcoholic solution of nickel nitrate, or nickel nitrate and cobalt nitrate, in the electrolytic impregnation of the corresponding hydroxide in the plaque.

SUMMARY OF THE INVENTION

Unlike the prior art, the present invention does not control pH by progressive addition of acid or nitrite, or use an aqueous alcoholic solution.

The invention is based on the discovery that different types of impregnating circuits can be used together to impregnate a given cathode, and that a type of circuit which tends to increase bath pH can be used simultaneously or alternately with a type of circuit which tends to reduce bath pH, so that a small net change in bath pH is achieved whereby pH is maintained within the desired range. In accordance with this invention, the pH of the bath is electrically maintained within the acidic range, approximately within the range of 1.8 to 3.5, by the concurrent or alternate operation of two electric circuits. One circuit increases the pH of the bath, while the other reduces pH. In the preferred procedure, the pH increasing circuit comprises a consumable anode of nickel metal, a source of direct current, and at least one plaque to be impregnated, which is connected to the negative side of the current source; the pH decreasing control circuit comprises a power source, a cathode (preferably the same cathode as in the pH increasing circuit), and an inert anode of nonconsumed material such as platinum or titanium coated with platinum, rhodium, palladium, or the like. By adjusting the times of operation and/or the current rates in the two circuits, pH can be maintained within a desired range. The plaque is impregnated by each circuit.

DESCRIPTION OF THE DRAWINGS

The invention can best be described by reference to the accompanying drawings, in which.

DETAILED DESCRIPTION

Figure 2:
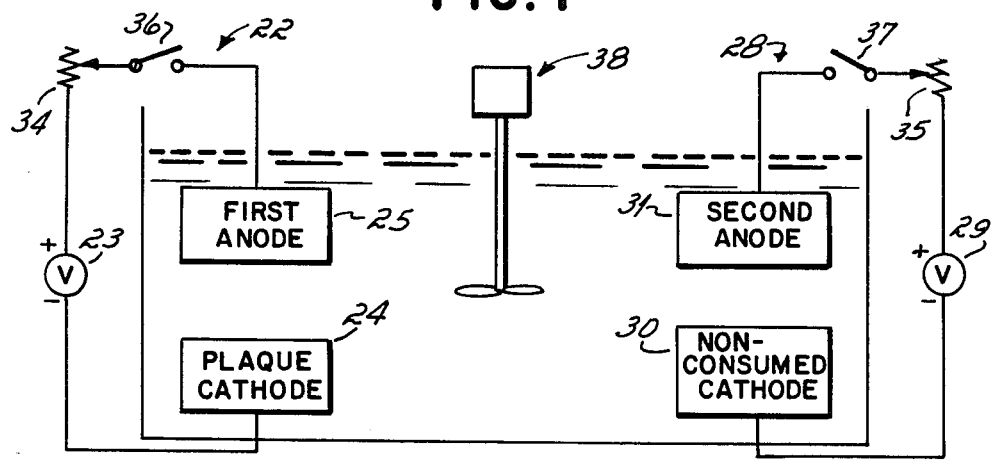
FIG. 2 is a schematic illustration of an apparatus for carrying out the process of a second embodiment of the invention.
Figure 3:
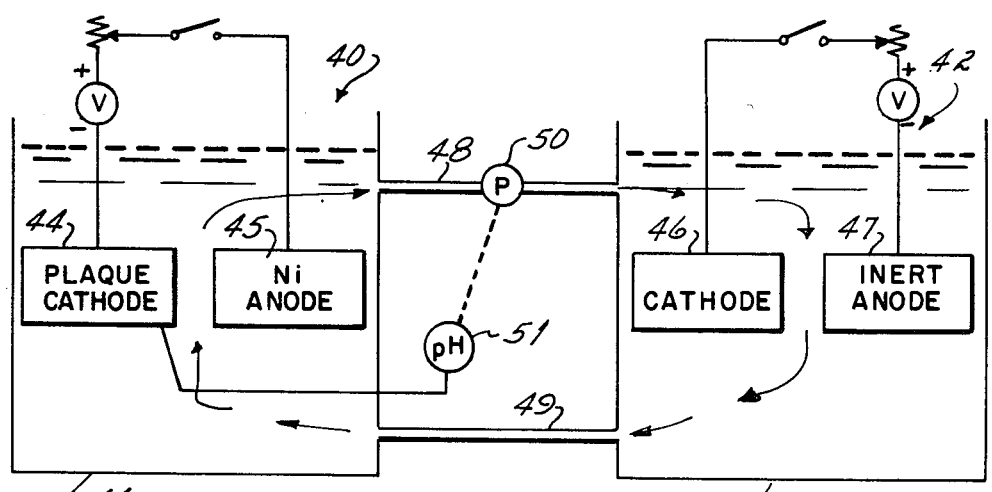
FIG. 3 is a schematic illustration of an apparatus for carrying out the process of a third embodiment of the invention.

The process of this invention comprehends the use of two electric circuits, the operation of one of which tends to increase pH and the operation of the other of which tends to decrease pH, roughly in an offsetting manner. The circuits can use a common power source and one or more plaques as a common cathode, but with different anodes (FIG. 1); or they can be separate circuits in a single tank, as shown in FIG. 2; or they can be separate circuits operated in separate but connected chambers of a tank with recirculation means between the two chambers, as shown in FIG. 3. It is contemplated that the nickel anode, while shown as a single anode for the sake of simplicity, will in practice comprise two or more anodes disposed symmetrically or on opposite sides of the plaque or plaques to be impregnated. Parameters of plaque fabrication, impregnating current density, plaque positioning relative to the anodes, and other impregnating details except as set forth herein, may be in accordance with conventional practice and do not comprise the invention.

Figure 1:
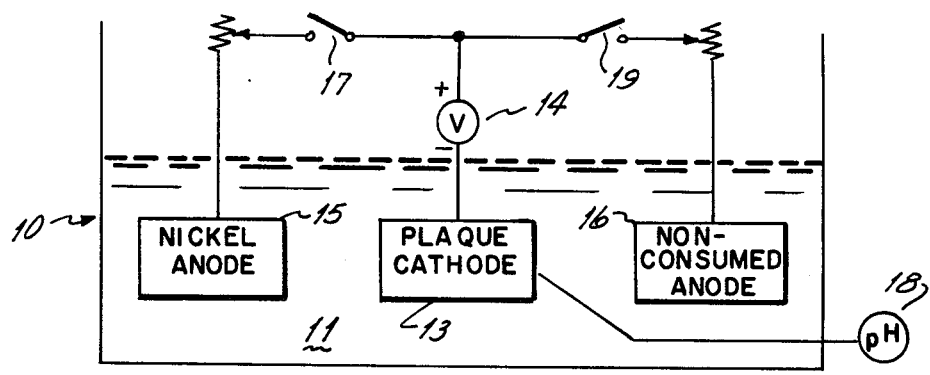
FIG. 1 is a schematic illustration of an apparatus for carrying out the process of a preferred first embodiment of the invention.

In FIG. 1 the impregnation is carried out in a tank 10 which contains a bath 11 comprising a dissolved salt as a source of nickel nitrate, $Ni(NO_3)_2$. The bath may additionally contain up to about 10 mol percent of cobalt nitrate, $CO(NO_3)_2$. In this embodiment, which presently constitutes the preferred embodiment, one or more plaques to be impregnated, one of which is designated as 13, are connected as cathodes to the negative side of a source of direct current 14. The positive side of the power source can alternately be connected through switches 17, 19 and associated variable resistors, to either or both of two anodes, one a consumable nickel anode 15, and the other an inert (i.e., non-consumed) anode 16, such as platinized titanium.

In the preferred mode of operation, when the power source is connected only to the consumable nickel anode 15, current flows from anode 15 to cathode 13 through bath 11 and causes the formation of nickel hydroxide within the pores of the plaque. As this procedure is carried out, the pH of the bath tends gradually to increase. The pH can be monitored by a pH meter 18, which may be of conventional type. When the pH in the region adjacent the plaque 13 becomes undesirably high, the two switches are operated to disconnect the power supply from anode 15 and to connect it to the inert anode 16. Energizing the inert anode causes current to flow from it to plaque 13 and impregnation of the plaque continues. However, with the current flowing from the inert anode, the pH of the bath is gradually reduced. By monitoring the pH and alternately switching between the pH increasing circuit and the pH decreasing circuit, and/or by adjustment of the current rates, the pH of the bath can be kept within the desired range. It is contemplated that automated control means may be used, which can for example be responsive to the pH meter.

In general, it is preferred to operate at a solution molarity of about 1.5M to 3.0M nickel nitrate with up to 10% (weight) cobalt nitrate. Solution temperature should be in the range of 90° C. to boiling. Current density at the plaque should be about 0.01 to about 0.08 amp./cm$^2$.

In the embodiment of FIG. 2, two separate electrolytic circuits are provided in the bath, each having a different anode and a different cathode than the other. One circuit 22 includes a source of direct current 23, a porous metal plaque 24 connected as a cathode, i.e., to the negative side of power source 23, and an anode 25 which is connected to the positive side of power source 23.

A second circuit 28 includes another source of direct current 29, a non-consumed cathode 30, such as nickel sheet, but which can be an impregnable metal plaque similar to plaque 24; and a second anode 31. One or the other of anodes 25 and 31 should comprise consumable nickel, and that circuit will act to increase pH; the other anode 31 or 25 should comprise an inert (non-consumed) material, such as platinized titanium, and that circuit will act to reduce pH. Preferably the anode 25 in the circuit with the plaque to be impregnated will comprise the consumable nickel anode, but depending upon the proximity of the anodes to the two cathodes, the anode 31, if closer to cathode 24 than to cathode 30, may comprise the consumable nickel anode. Each circuit 22 and 28 includes means for adjusting the current in it, such as a rheostat as designated at 34 and 35 respectively, and/or switches 36 and 37.

Mixing means such as indicated at 38 can be used to establish more uniform conditions around the plaque. When energized, each circuit tends to cause nickel hydroxide to deposit at some rate in plaque 24. However, operation of circuit 22 tends to increase pH, while operation of circuit 28 tends to decrease pH. The net change in pH around plaque 24 will depend upon the currents in the two circuits, the proximities of the anodes and cathodes, and other factors. By adjusting the positions, times of operation and/or the amperages in the respective circuits, a balance can be attained whereby pH is maintained within a range of about 1.5 to 3.5.

The system of FIG. 3 differs from that of FIG. 2 in that it provides pH control by regulated mixing of impregnating baths in different compartments and having different pHs. A pH increasing impregnating circuit 40 is provided in a compartment 41; a pH reducing circuit 42 is provided in a second compartment 43. In this embodiment circuit 40 includes a porous plaque 44 and a consumable nickel anode 45; and circuit 42 includes a cathode 46 and an inert anode 47. The tank (both compartments) is filled with nickel nitrate aqueous solution, the compartments being connected by circulating lines 48 and 49. In one of these lines, circulation means such as a pump 50 is provided. During operation the pH in compartment 41 will tend to increase; the pH in compartment 43 will tend to decrease. The pH in compartment 41 is kept in the preferred range of 1.8 to 3.5 by mixing the lower pH fluid from compartment 43 with it. To this end pump 50 can be operated automatically in response to a pH meter 51, which measures pH in the region near plaque 44.

Where a dual cathode system is used, as in the embodiments of FIGS. 2 and 3, both cathodes can be porous plaques, and both will be impregnated with nickel hydroxide from the bath. However, the plaque best experiencing the desired current density and pH will ordinarily be impregnated more effectively. The plaque of the circuit with the non-consumed anode is best treated as a dummy or disposable cathode, since it is not as well impregnated.

Having described the invention, what is claimed is:
1. A process for impregnating a porous plaque with nickel hydroxide in a bath containing a soluble source of a nickel salt, comprising,
   operating two electric circuits in said bath to impregnate at least one such plaque,
   one of said two circuits comprising a consumable nickel anode, a cathode, and a source of current,
   the other of said two circuits comprising an inert anode, a cathode, and a source of current,
   the plaque to be impregnated being at least one of said cathodes,
   at least one of said circuits being operated under conditions to impregnate said plaque,
   the operation of said one circuit tending to cause pH in the bath to increase,
   the operation of the other of said two circuits tending to cause pH in the bath to decrease,
   the two circuits being operated at rates to maintain the pH of said bath within a desired acidic range for said impregnation.

2. The process of claim 1 wherein said plaque is connected as a common cathode in both said circuits.

3. The process of claim 1 wherein said plaque is connected as the cathode in said one circuit.

4. The process of claim 1 wherein said circuits are operated simultaneously during said impregnation.

5. The process of claim 1 wherein said circuits are electrically separate, said plaque is the cathode in said one circuit, and the other of said two circuits has a non-consumed cathode.

6. The process of claim 1 wherein said circuits are operated at rates sufficient to maintain the pH of the bath in the region adjacent the plaque in the approximate range of 1.8 to 3.5.

7. The process of claim 1 wherein said consumable nickel anode is scrap nickel metal.

8. The process of claim 1 wherein said inert anode is titanium coated with platinum, rhodium, palladium or the like.

9. The process of claim 1 wherein said bath also contains up to about 10 mol. % of cobalt nitrate.

10. A process for impregnating a porous metal plaque with nickel hydroxide in a bath containing a nickel salt in solution, comprising, operating two electric circuits in said bath with said plaque comprising the cathode in each said circuit, one circuit being a pH increasing circuit including said plaque, a source of current, and a consumable nickel anode in said bath, the other circuit being a pH decreasing circuit and comprising said plaque, a source of current, and an inert anode, the two circuits being operated at rates and times to maintain the pH of said bath within a desired acidic range for impregnation.

11. The process of claim 10 wherein said circuits are operated alternately.

12. The process of claim 11 wherein said circuits are operated simultaneously.

13. A process for impregnating the pores of a porous metal plaque with nickel hydroxide from a bath containing nickel salt in solution, comprising, operating two electric circuits in said bath, one circuit being a pH increasing circuit having an anode of consumable nickel, a cathode in said bath, and a source of direct current, the other circuit being a pH decreasing circuit and comprising an anode of an inert non-consumed metal, a cathode of a material which is not consumed in operation, and a source of direct current, at least one of said cathodes being of sintered metal and being the plaque to be impregnated, passing a current through said pH increasing circuit to cause said plaque to be impregnated, and at least periodically operating said pH decreasing circuit to provide a current therein which maintains the pH of said solution within a desired range.

14. The process of claim 13 wherein said bath is contained in two compartments, the circuits being disposed in the respective compartments, the compartment containing the nickel anode having a higher pH than the compartment containing the anode of non-consumed material, and at least periodically circulating said bath through both said compartments so that the pH in the compartment containing the plaque to be impregnated is maintained in said desired range.

15. The process of claim 13 wherein said pH increasing circuit is energized intermittently rather than continuously.

16. The process of claim 13 wherein the plaque to be impregnated is in the pH increasing circuit.

17. The process of claim 13 wherein the plaque to be impregnated is in the pH decreasing circuit.

18. The process of claim 13 wherein the said circuits are operated simultaneously, and the amperages in the respective circuits are adjusted to maintain pH in a desired range.

19. The process of claim 13 wherein the nickel salt is nickel nitrate.

* * * * *